Sept. 4, 1962  A. C. ANDERSON  3,052,585
METHODS OF MAKING REINFORCED PLASTIC
VESSELS WITH INTEGRALLY FORMED HEADS
Filed Sept. 25, 1959
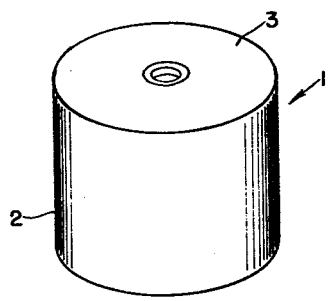
FIG. I
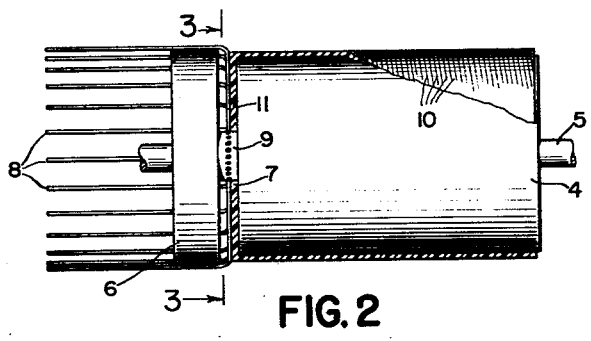
FIG. 2
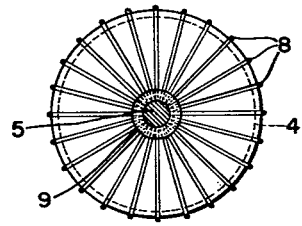
FIG. 3.
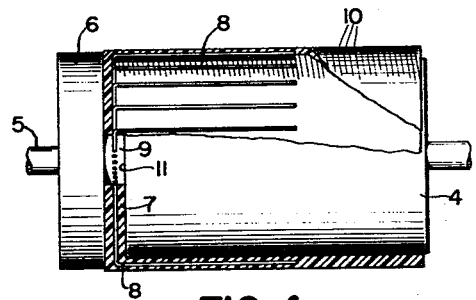
FIG. 4
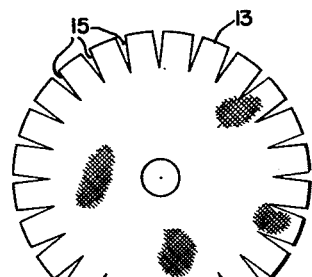
FIG. 5
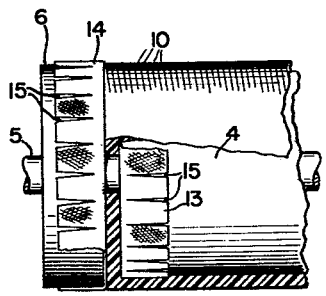
FIG. 6
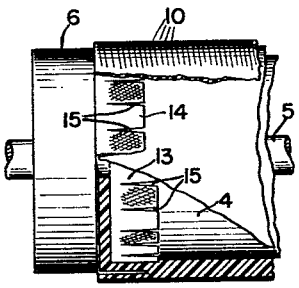
FIG. 7
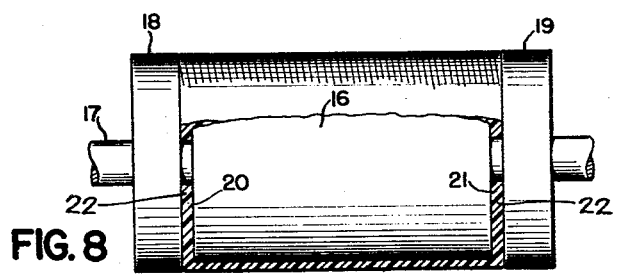
FIG. 8
INVENTOR.
ARCHIE C. ANDERSON
BY
Attorneys United States Patent Office 3,052,585
Patented Sept. 4, 1962

3,052,585
METHODS OF MAKING REINFORCED PLASTIC VESSELS WITH INTEGRALLY FORMED HEADS
Archie C. Anderson, Milwaukee, Wis., assignor to A. O. Smith Corporation, Milwaukee, Wis., a corporation of New York
Filed Sept. 25, 1959, Ser. No. 842,508
15 Claims. (Cl. 156—175)

This invention relates to a method of fabricating reinforced plastic articles and more particularly to a method of fabricating a reinforced plastic vessel with an integral head.

Reinforced plastic vessels are used in many applications where corrosion resistance and light weight are prime factors. A reinforced plastic vessel is generally fabricated by winding or laying up a generally cylindrical shell and then attaching preformed heads to the ends of the shell.

The present invention is directed to a method of fabricating a reinforced plastic vessel having an integral reinforced head in a continuous winding operation. More specifically, a mandrel and a disc are secured in spaced relation to a rotatable shaft, and a series of reinforcing wires are secured within holes in an annular plug secured to the shaft and extend radially outwardly from the plug within the clearance between the mandrel and the disc. The wires are provided with a substantially greater length than the radius of the mandrel and the outer ends of the wires are bent at substantially right angles and extend longitudinally over the disc.

A fibrous strand impregnated with a resin is initially wound in the clearance between the wires and the end of the mandrel to form the inner layer of the head of the vessel. When the windings within the clearance are flush with the outer surface of the mandrel, the strand is then wound over the outer surface of the mandrel to form a layer of the vessel wall.

The reinforcing wires are then individually rotated so that the bent ends extend longitudinally over the layer of windings on the surface of the mandrel. The strand is then wound in the clearance between the wires and the adjacent end of the disc to form the outer layer of the head with the reinforcing wires imbedded within the layers. When the winding in this portion of the clearance is flush with the surface of the mandrel, the winding pattern is again continued over the surface of the mandrel to form a second outer layer of the vessel wall and completely imbed the reinforcing wires within the fibrous windings.

The method of the invention is a simple and inexpensive procedure for fabricating a reinforced plastic vessel with an integral reinforced head in a continuous winding operation. The reinforcement is imbedded within the head and extends axially within the side wall of the vessel to add strength and rigidity to both the head and shell.

In a modified form of the invention, a sheet of fibrous cloth or fabric is employed as a reinforcement for the tank bottom. In this case, a pair of fabric sheets are disposed in spaced relation within the slot and the strand is wound between the sheets and subsequently over the mandrel surface. The peripheral margins of the sheets are then bent over the windings on the mandrel and additional windings are made over the bent margins to imbed the same within the vessel wall.

In another form of the invention, the mandrel is formed of a low melting point alloy or wax or a water soluble material and a disc is spaced from each end of the mandrel. In this case, the fibrous strand is wound in both clearances between the mandrel and the respective discs and over the outer surface of the mandrel to form a vessel with two integral heads. The mandrel is removed from within the completed vessel by heating the vessel to a temperature above the melting point of the mandrel in the case of the low melting point alloy or wax, or flushing with water in the case of the water soluble material.

Other objects and advantages will appear in the course of the following description.

The drawings illustrate the best mode presently contemplated of carrying out the invention.

In the drawings:

FIGURE 1 is a perspective view of the completed vessel fabricated according to the invention;

FIG. 2 is a side elevation with parts broken away in section of an apparatus for carrying out the process of the invention;

FIG. 3 is a transverse view taken along line 3—3 of FIG. 2;

FIG. 4 is a view similar to FIG. 2 showing the reinforcing wires rotated over the mandrel and a second layer of long reinforcing fibers wound over the reinforcement.

FIG. 5 is a view similar to FIG. 3 showing a modified form of the invention in which fabric is used for the head reinforcement;

FIG. 6 is a view similar to FIG. 2 showing the fabric sheets bent over the mandrel and disc and the strand wound between the sheets;

FIG. 7 is a side elevation of the completed structure with parts broken away and showing the modified form of the invention with the fabric bent over the first layer of the vessel wall; and FIG. 8 is a view similar to FIG. 2 showing a second modified form of the invention in which two heads are wound integrally with the vessel shell.

The drawings illustrate a continuous winding method for fabricating a reinforced plastic vessel 1 having a generally cylindrical wall 2 and an integrally formed head 3. The apparatus for producing the vessel includes a generally cylindrical mandrel 4 which is secured to a rotatable shaft 5. A disc 6 having a diameter similar to that of mandrel 4, is also secured to shaft 5 in spaced relation to mandrel 4 to provide a slot 7 therebetween.

A series of metal wires or other rigid, elongated reinforcing members 8 are disposed in radial openings in an annular plug 9 secured to shaft 5 and extends radially outwardly from the plug within the slot 7. The wires 8 are provided with a substantially greater length than the radius of mandrel 4 and the ends of the wires are bent at substantially right angles and extend longitudinally over the outer surface of disc 6.

In accordance with the invention, a fibrous strand 10 which is preferably initially impregnated with a binding material, such as an uncured thermosetting resin, is wound in the slot 7 between the end wall 11 of the mandrel 4 and the wires 8 to form an inner layer of the head 3 of the vessel. Where the strand 10 is without initial impregnation, the series or layer of windings may be impregnated with resin after being wound as described. The strand 10 is preferably in the form of long, substantially continuous filaments or fibers and may take the form of refractory fibers such as glass, asbestos or ceramic filaments, or synthetic fibers such as rayon, nylon or Dacron which is polyethylene terephthalate or vegetable or animal fibers, or metal filaments.

The resin, used to impregnate the fibers, may be any of the conventional resins generally used for laminates or the like. The resins may include thermosetting resins such as epoxys, polyesters ureas, melamines and the like, or thermoplastics resins such as polyvinyl chloride and the like.

The winding of the fiber strand 10 is continued within the slot 7 until the fibers are flush with the peripheral surface of mandrel 4 and then the winding is continued in a generally helical pattern over the outer surface of the mandrel to form an inner layer of the shell or wall 2 of the vessel, as shown in FIG. 2. The winding of the fiber strand 10 on the surface of the mandrel 4 can be continued to build up any number of superimposed layers on the mandrel to provide the desired strength for the vessel wall.

After the desired number of layers of the fibrous strand have been wound on the outer surface of the mandrel, the wires 8 are individually rotated within the openings in plug 9 to position the outer bent ends of the wires over the layers of fibers wound on the mandrel surface.

It is contemplated that instead of using bent wires, straight radial wires can be disposed in slot 9 and after winding within the slot and over the surface of the mandrel, additional axial extending sections of wire can be welded or brazed to the outer ends of the straight radial wires.

Additional windings of the fiber strand 10 are then made in the portion of the slot 7 between the wires 8 and the end surface of the disc 6 to form the outer layer of the head 3. The winding pattern is then continued over the outer surface of the mandrel and over the bent ends of the wires 8 to form the outer layer of the vessel wall. The winding is continued over the mandrel surface until the desired number of layers have been wound.

After the winding is completed, the vessel is heated to cure or polymerize the thermosetting resin and provide a strong rigid article. In the case of a thermosetting resin, heat is employed to fuse the layers together.

The disc 6 is removed from shaft 5 and the vessel can then be stripped from the mandrel. The plug 9 can be maintained with the vessel and the central hole 12 in the head 3 of the vessel, which was formed by the shaft 5, can be closed off by a suitable seal or the like when the vessel is used in service.

By the method of the invention, a fiber reinforced vessel can be fabricated with a reinforced head in a single operation. This procedure not only saves the time necessary for forming or fabricating a separate head but also saves the handling and curing time which would be necessary when employing heads and shells. As both the reinforcing members 8 and the fibrous strand 10 extend continuously from the head to the wall, a substantially stronger vessel results.

The reinforcing wires 8, which radiate from the center of the head 3 and are bent outwardly into the wall 2 or shell, provide reinforcement for the head and the lower end of the wall which, in service, would be subjected to the greatest amount of internal pressure from the contained material. The reinforcing wires 8 are completely imbedded within the plastic material of the vessel wall so that the wires are not exposed to corrosive attack from the contained material.

While the head 3 is shown as being substantially flat, it is contemplated that the head may be provided with mild curvatures, if desired.

FIGS. 5–7 show a modified form of the invention in which generally circular flat pieces of fabric or cloth 13 and 14 are employed as reinforcement for the head. In this form of the invention, the fabric sheets 13 and 14 are provided with central openings and are slipped over the shaft 5 before the disc 6 is disposed on the shaft.

The members 13 and 14 can take the form of fibrous material, such as fabric or matting fabricated from ceramic, synthetic or animal fibers, or the members can be wire screen or the like.

The members 13 and 14 can be impregnated with a liquid partially cured resin or a solid uncured resin in which case the fabric will be somewhat rigid, yet deformable, and will support its own weight. Alternately, the fabric members 13 and 14 can be impregnated with a liquid uncured resin and the resin in this state will not lend any rigidity or stiffness to the fabric.

The members 13 and 14 are disposed in spaced relation within the slot 7 with one of the members in contact with the end of the mandrel 4 and the other in contact with the face of the disc 6. The outer margins of the members are bent axially over the outer surface of the mandrel and disc, respectively, as shown in FIG. 6. To prevent overlaps in the bent margins, a series of notches 15 can be provided in the periphery of the members.

If the fabric members 13 are impregnated with a partially cured or solid resin, the outer margins of the members will remain in the bent condition without the need of clamps or holding members. However, if a liquid uncured resin is used, the members 13 and 14 may be soft and flexible and the bent margins would then have to be held by suitable ring clamps to maintain the members in proper location with respect to the disc 6 and mandrel 4.

In a manner similar to the first embodiment, the fibrous stand 10 is initially wound in the clearance between the members 13 and 14 until the windings are flush with the outer surface of the mandrel and then the windings are wound over the bent margin of the member 13 and over the outer surface of the mandrel to provide the inner layer of the wall of the vessel. The outer margin of the reinforcing member 14 is then bent axially over the layer of fibers wound on the mandrel surface.

After bending the reinforcing member 14 over the mandrel 4, additional windings of the fibrous strand 10 are made helically over the bent margin of member 14 and over the original layers of fibers wound on the mandrel surface. The winding pattern is continued until the desired number of layers are wound on the surface of the mandrel to provide the vesesl with the desired strength.

It is contemplated that a single reinforcing member 13 can be employed instead of the pair as described above. In this case, the member would be located on either the inner or outer surface of the head and wall depending on where the glass cloth was initially positioned.

It is also contemplated that a pair of open ended vessels can be formed in a single operation with the process shown in FIGS. 1–7. In this situation, a second disc 6 would be spaced from the opposite end of the mandrel and the reinforcement and winding pattern would be applied in this space or slot in the manner described with respect to slot 7. The completed vessel would then be cut intermediate its length to form a pair of open ended vessels.

FIG. 8 shows a second modified form of the invention in which a vessel is formed with two integral heads. In this embodiment, a generally cylindrical mandrel 16 is secured to a shaft 17 corresponding to shaft 5 of the first embodiment. The mandrel 16 is adapted to be formed of a low melting point metal or alloy or a wax which has a liquidus temperature generally slightly above the curing temperature of the thermosetting resin to be employed in the process. Alternately, the mandrel can be formed of a water soluble material, such as a compressed salt, which will dissolve when soaked or flushed with water.

A pair of discs 18 and 19 are secured to the shaft 17 and disposed in spaced relation to the corresponing ends of the mandrel 16 to provide slots 20 and 21, respectively.

In this embodiment, the fiber windings 22 are initially made in the slot 20 to fill the slot and form one head of the vessel. When the windings in the slot 20 are flush with the surface of the mandrel, the winding pattern is then continued over the outer surface of the mandrel to form the vessel wall and into the slot 21. Windings are made within the slot 21 until the same is filled to form the other head of the vessel. Additional windings can be made over the outer surface of the mandrel until the desired wall thickness is provided for the vessel.

Reinforcements, such as reinforcing wire 8 or member 13 can be employed with one or both heads in a manner similar to that shown in the previous embodiments.

After the desired wall thickness has been built up on the vessel, the discs 18 and 19 and shaft 17 are removed from the mandrel 16. The mandrel and the vessel formed thereon are then heated to an elevated temperature to cure the resin and provide a strong, rigid vessel having integral heads. Subsequently heating the vessel to a temperature above the curing temperature and below the temperature of decomposition of the vessel will melt the low melting point alloy or wax mandrel and the molten alloy or wax will flow out of the vessel through one of the axial openings in the head. In the case of the soluble mandrel, the vessel and mandrel are soaked or flushed with water or other suitable solvent therefor after the resin has been cured and the mandrel material will dissolve in the solvent and thus be removed from the vessel. This embodiment provides a method for fabricating a reinforced plastic vessel having two integral heads in a continuous winding operation. The low melting point or water soluble mandrel provides a support for the winding operation and yet can be removed from the interior of the completed vessel.

Various modes of carrying out the invention are contemplated as being within the scope of the following claims particularly pointing out and distinctly claiming the subject matter which is regarded as the invention.

I claim:

1. In a method of fabricating a reinforced plastic vessel with an integral head, the steps of disposing a mandrel and a disc on a shaft with an end of the mandrel being spaced from the adjacent end of the disc to provide a slot therebetween, disposing a reinforcing member in the slot in spaced relation to both the end of the mandrel and the end of the disc, said reinforcing member extending radially outward beyond the outer periphery of said mandrel, winding a resin impregnated fibrous strand in the slot between the reinforcing member and the end of the mandrel to form a portion of the head of the vessel and continuing the winding until the fibrous strand is substantially flush with the outer periphery of the mandrel, winding the strand over the outer periphery of the mandrel to form a first portion of the wall of the vessel, extending the reinforcing member over said portion of the wall of the vessel, winding a similar resin impregnated fibrous strand within the slot between the reinforcing member and the end of the disc to form a second portion of said head and thereby imbed the reinforcing member within said head, continuing the winding of said last named strand over the said first portion of the vessel wall to form an additional portion of said wall and thereby imbed the reinforcing member within said wall, and thereafter curing the resin.

2. A method of fabricating a reinforced plastic vessel with an integral head, comprising providing a substantially cylindrical mandrel adapted to support the shell of the vessel during forming thereof and having an end wall adapted to shape the head of the vessel during forming thereof, disposing a forming member in spaced relation to said end wall to provide a radial circumferentially extending slot therebetween for receiving the head of the vessel during forming thereof, disposing a reinforcing member radially within the slot and spaced axially from the end wall of the mandrel bordering the slot and from said forming member, winding a strand of reinforcing fibers impregnated with an uncured thermosetting resin in the slot between the reinforcing member and said end wall of the mandrel bordering the slot to form a first portion of the head of the vessel, winding the strand over the outer peripheral surface of the mandrel adjoining said end wall to form the shell of a similar vessel, winding the strand in the slot between the reinforcing member and said forming member to form a second portion of the head of the vessel with said reinforcing member being imbedded between said first and second portions of the head, curing the resin to bond the strand and the reinforcing member together as an integral structure, and removing the structure thus formed from the mandrel.

3. A method of fabricating a reinforced plastic vessel with an integral head, comprising the steps of a providing a substantially cylindrical mandrel adapted to support the shell of the vessel during forming thereof and having an end wall adapted to shape the head of the vessel during forming thereof, locating a forming member in predetermined spaced relation to said end wall to provide a radial circumferentially extending slot therebetween for receiving the head of the vessel during from thereof, disposing a reinforcing member radially within the slot and spaced axially from the end wall of the mandrel bordering the slot and from said forming member, winding a strand of substantially continuous reinforcing fibers impregnated with an uncured thermosetting resin in the slot between the reinforcing member and said end wall of the mandrel bordering the slot to form a portion of the head of the vessel, winding the strand over the outer peripheral surface of the mandrel adjoining said end wall to form a first portion of the shell of the vessel, winding a similar resin impregnated strand in the slot between the reinforcing member and said forming member to form a second portion of the head of the vessel with said reinforcing member being imbedded between said first and second portions of the head, winding said last named strand over the first portion of the vessel shell to form a second portion of the vessel shell, curing the resin to bond the strand and the reinforcing member together as an integral structure, and removing the structure thus formed from the mandrel.

4. A method of fabricating a reinforced resin vessel with an integral head and walls, comprising the steps of disposing a mandrel on a shaft, said mandrel being formed of a low melting point material having a melting temperature above the curing temperature of the resin used in fabricating the vessel, disposing a disc on the shaft in spaced relation with each end of the mandrel to provide a slot between each disc and the corresponding end of the mandrel, winding a resin impregnated fibrous strand within each of said slots and over the outer surface of the mandrel with the windings within said slots constituting the heads of the vessel and having a central opening thereing receiving said shaft and the windings on the outer surface of the mandrel providing the vessel wall, removing the vessel and the mandrel from the shaft, heating the vessel and the mandrel to an elevated temperature below the melting point of the mandrel to thereby cure the resin, and thereafter heating the vessel and mandrel to a second temperature above said elevated temperature to melt the mandrel with the melted material draining from the vessel through the central openings in the heads formed by the shaft.

5. A method of fabricating a reinforced resin vessel with an integral head and walls, comprising the steps of disposing a mandrel on a shaft with said mandrel having a peripheral surface and a pair of end surfaces and said mandrel being formed of a low melting point material having a liquidus temperature slightly above the curing temperature of the resin used in fabricating the vessel, winding a resin impregnated fibrous strand on said shaft adjacent one of said end surfaces and continuing said winding until the strand is substantially flush with the peripheral surface of said mandrel to form one head of the vessel having a central opening receiving said shaft, winding the strand over the outer peripheral surface of the mandrel to form the wall of the vessel, thereafter winding the strand on said shaft adjacent the other of said end surfaces and continuing the winding until the strand is substantially flush with the peripheral surface to form a second head of the vessel integrally connected to the wall of the vessel and having a central opening receiving said shaft, removing the vessel and the mandrel from the shaft, heating the vessel and the mandrel to an elevated temperature below the melting point of the low melting point mandrel to thereby cure the resin, and subsequently heating the mandrel and the vessel to a second temperature above said liquidus temperature to melt the mandrel with the melted mandrel draining from the vessel through the central openings in the heads formed by the shaft.

6. In a method of fabricating a reinforced resin vessel having an integral head and walls, disposing a reinforcing member in a circumferential extending slot in a mandrel with said reinforcing member extending radially within the slot and being spaced longitudinally from a wall of the mandrel bordering the slot, winding a strand of reinforcing fibers impregnated with uncured thermosetting resin in the slot between the reinforcing members and said wall of the mandrel to form a portion of the head of the vessel, and curing the resin to bond the strand and reinforcing member together as an integral structure.

7. A method of fabricating a reinforced resin vessel with an integral head, comprising disposing a reinforcing member in a circumferential extending slot in a cylindrical mandrel with said reinforcing member extending radially within the slot and being spaced longitudinally from an end wall of the mandrel bordering the slot and the outer portion of said reinforcing member projecting outwardly beyond the outer peripheral surface of the mandrel, winding a strand of substantially continuous reinforcing fibers impregnated with an uncured thermosetting resin in the slot between the reinforcing member and said wall of the mandrel to form a portion of the head of the vessel, winding the strand over the outer peripheral surface of the mandrel adjoining said wall to form an inner layer of the wall of the vessel, disposing the outer portion of said reinforcing member over said inner layer of the wall, winding the strand over said outer portion of the reinforcing member and over said inner layer to form an outer layer of the wall and imbed said outer portion of the reinforcing member within said layers, curing the resin to bond the strand and the reinforcing member together as an integral structure, and removing the structure thus formed from the mandrel.

8. A method of fabricating a reinforced resin vessel with an integral head, comprising the steps of disposing a mandrel on a shaft with said mandrel having a peripheral surface and a pair of end surfaces, and said mandrel being formed of a low melting point material having a liquidus temperature slightly above the curing temperature of the resin used in fabricating the vessel, winding a resin impregnated fibrous strand on the shaft adjacent one of said end surfaces and continuing said winding until the strand is substantially flush with the peripheral surface of the mandrel to form one head of the vessel having a central opening receiving the shaft, winding the strand over the outer peripheral surface of the mandrel to form the wall of the vessel, thereafter winding the strand on said shaft adjacent the other of said end surfaces and continuing the winding until the strand is substantially flush with the peripheral surface of the mandrel to form a second head of the vessel integrally connected to the wall of the vessel and having a central opening receiving the shaft, removing the vessel and the mandrel from the shaft, heating the vessel and the mandrel to an elevated temperature to cure the resin and melt the mandrel with the melted mandrel draining from the vessel through the central openings in the heads formed by the shaft.

9. In a method of fabricating a reinforced plastic vessel with an integral head and walls, the steps of disposing a cylindrical mandrel and a disc of a diameter corresponding to the diameter of the mandrel on a shaft with an end of the mandrel being spaced adjacent one face of the disc to provide a slot therebetween, disposing a pair of generally flat reinforcing members in the slot in spaced relation to each other with one of said reinforcing members being in contact with said face of the disc and the other of said reinforcing members being in contact with the corresponding end surface of the mandrel, the outer margins of said reinforcing members projecting outwardly beyond the outer surface of the mandrel and the disc, bending the outer margin of each reinforcing member axially in a direction away from the slot to dispose the outer margins of the reinforcing members in overlapping relation with the outer surface of the mandrel and the disc, respectively, winding a fibrous strand in the slot between the reinforcing members and continuing the winding until the fibrous strand is substantially flush with the outer surface of the mandrel to provide a head of the vessel, winding the fibrous strand over the outer surface of the mandrel and over the outer margin of one of the reinforcing members disposed over the mandrel to form a first layer of the wall of the vessel, bending the outer margin of the second reinforcing member disposed in contact with the disc axially to overlap said first layer, winding the fibrous strand over said first layer and over said outer margin of the last named reinforcing member to form a second layer of the wall of the vessel, impregnating the series of windings with an uncured thermosetting resin, and curing the resin to form a rigid structure with the head integrally connected to the vessel wall and the reinforcing members serving to reinforce the vessel.

10. In a method of fabricating a reinforced plastic vessel with an integral head and wall, the steps of disposing a cylindrical mandrel and a disc of a diameter corresponding to that of said mandrel on a shaft with the end of the mandrel being spaced from the adjacent end of the disc to provide a slot therebetween, disposing a series of substantially rigid elongated reinforcing members in circumferentially spaced relation within said slot, said reinforcing members having an inner portion rotatably secured to the shaft and having an outer portion disposed generally normal to said inner portion and extending longitudinally over the outer surface of the disc, winding a resin impregnated fibrous strand in the slot between the reinforcing members and the end of the mandrel to form a portion of the head of the vessel and continuing the winding until the fibrous strand is substantially flush with the periphery of the mandrel, winding the fibrous strand over the periphery of the mandrel to form a first portion of the wall of the vessel, rotating the reinforcing members to dispose the outer portion of said reinforcing members longitudinally over said portion of the wall of the vessel, winding the fibrous strand within the slot between the reinforcing members and the end of the disc to form a second portion of the head of the vessel and thereby imbed the reinforcing members within said head and continuing the winding until the fibrous strand is substantially flush with the outer surface of the mandrel, continuing the winding of said fibrous strand over said first portion of the vessel wall to form a second portion of said vessel wall and thereby imbed the outer portion of said reinforcing members within said wall, and curing the resin in said strand to produce an integral vessel.

11. A method of fabricating a reinforced resin vessel with an integral head, comprising the steps of disposing a mandrel on a shaft with said mandrel having a peripheral surface and a pair of end surfaces and said mandrel being formed of a solid soluble material, winding a resin impregnated fibrous strand on said shaft adjacent one of said end surfaces and continuing said winding until the strand is substantially flush with the peripheral surface of said mandrel to form one head of the vessel having a central opening receiving said shaft, winding a strand over the outer peripheral surface of the mandrel to form a wall of the vessel, thereafter winding the strand on said shaft adjacent the other of said end surfaces and continuing the winding until the strand is substantially flush with the peripheral surface to form a second head of the vessel integrally connected to the wall of the vessel and having a central opening receiving said shaft, removing the vessel and the mandrel from the shaft, heating the vessel and the mandrel to an elevated temperature to cure the resin, and subjecting the mandrel to the action of a solvent to thereby dissolve the mandrel in the solvent with the resulting solution draining from the vessel through the central openings in the heads formed by the shaft.

12. The method of claim 5 in which the soluble material of the mandrel is a compressed salt and the vessel and mandrel are soaked in water to thereby dissolve the salt and remove the mandrel from the vessel.

13. In a method of fabricating a reinforced plastic vessel with an integral head, the steps of disposing a series of spaced radially extending substantially rigid elongated elements in a circumferentially extending slot in a mandrel with said elements being spaced longitudinally from the walls of the mandrel bordering the slot, winding a strand coated with an uncured thermosetting resin in the slot between the elements and the inner of the walls of the mandrel bordering the slot to form a first portion of the head of the vessel, winding the strand over the outer peripheral surface of the mandrel adjoining said inner wall to form the shell of the vessel, extending the outer portion of said elements over the shell of the vessel, winding the strand in the slot between the elements and the outer of the walls bordering the slot to form a second portion of the head of the vessel with said elements being embedded within said first and second portions of the head, and curing the resin to bond the strand and the elements together as an integral structure.

14. In a method of fabricating a reinforced plastic vessel with an integral head, the steps of partially curing the resin in a resin impregnated fibrous sheet to provide a rigid deformable sheet, disposing the sheet in a circumferentially extending slot in a mandrel with said sheet extending radially within the slot and being spaced longitudinally from the walls of the mandrel bordering the slot, winding a strand impregnated with an uncured thermosetting resin in the slot between the sheet and the inner of the walls of the mandrel bordering the slot to form a first portion of the head of the vessel, winding the strand over the outer peripheral surface of the mandrel adjoining said inner wall to form a portion of the shell of the vessel, winding the strand in the slot between the sheet and the outer of the walls bordering the slot to form a second portion of the head of the vessel with said sheet being embedded between said first and second portions of the head, and completely curing the resin of the sheet and the resin impregnating the strand to bond the strand and the sheet together as an integral structure.

15. In a method of fabricating a reinforced plastic vessel with an integral head, the steps of impregnating a pair of fibrous sheets with an uncured thermosetting resin, partially curing the resin to provide rigid deformable sheets, disposing the sheets in a peripheral slot in a mandrel with said sheets being in spaced relation to each other with a first of said sheets being in contact with a first end surface of the mandrel bordering the slot and the second of the sheets being in contact with a second end surface of the mandrel bordering the slot, the outer margin of said sheets projecting outwardly beyond the outer surface of the mandrel, winding a strand impregnated with an uncured thermosetting resin in the slot between the sheets and continuing the winding until the strand is substantially flush with the outer surface of the mandrel to provide a head of the vessel, bending the outer margin of said first sheet over the outer surface of the mandrel adjoining said first end surface, winding the strand over the outer surface of the mandrel and over the outer margin of said first sheet to form a first layer of the wall of the vessel, bending the outer margin of the second sheet axially to overlap said first layer of the wall of the vessel, winding the strand over said first layer and over the outer margin of said second sheet to form a second layer of the wall of the vessel, and curing the resin of the sheets and the resin on the strand to form a rigid structure with the head integrally connected to the vessel wall and the sheets serving to reinforce the end portion of the vessel.

References Cited in the file of this patent

UNITED STATES PATENTS

| | | |
|---|---|---|
| 2,558,807 | Bailey | July 3, 1951 |
| 2,594,693 | Smith | Apr. 29, 1952 |
| 2,723,705 | Collins | Nov. 15, 1955 |
| 2,739,917 | Schulze | Mar. 27, 1956 |
| 2,744,043 | Ramberg | May 1, 1956 |
| 2,837,456 | Parilla | June 3, 1958 |
| 2,862,541 | Brink | Dec. 2, 1958 |
| 2,991,210 | Matkovich | July 4, 1961 |

UNITED STATES PATENT OFFICE
CERTIFICATE OF CORRECTION

Patent No. 3,052,585 September 4, 1962

Archie C. Anderson

It is hereby certified that error appears in the above numbered patent requiring correction and that the said Letters Patent should read as corrected below.

Column 3, line 38, before "heads" insert -- separate --; column 4, line 13, for "stand" read -- strand --; line 27, for "vesesl" read -- vessel --; column 5, line 73, strike out "a"; column 6, line 5, for "from" read -- forming --; lines 37 and 38, for "thereing" read -- therein --.

Signed and sealed this 22nd day of January 1963.

(SEAL)
Attest:

ERNEST W. SWIDER
Attesting Officer

DAVID L. LADD
Commissioner of Patents